(12) United States Patent
Matsufuji et al.

(10) Patent No.: US 8,313,574 B2
(45) Date of Patent: Nov. 20, 2012

(54) CELLULOSE ACYLATE FILM, OPTICAL FILM, POLARIZING PLATE, AND LIQUID CRYSTAL DISPLAY APPARATUS

(75) Inventors: Akihiro Matsufuji, Minami-Ashigara (JP); Takeichi Tatsuta, Ashigarakami-gun (JP); Hiroaki Sata, Minami-Ashigara (JP); Mamoru Sakurazawa, Minami-Ashigara (JP); Yasuo Mukunoki, Hadano (JP); Tatsuya Shimoyama, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 437 days.

(21) Appl. No.: 12/678,339

(22) PCT Filed: Sep. 26, 2008

(86) PCT No.: PCT/JP2008/067977
§ 371 (c)(1),
(2), (4) Date: Mar. 16, 2010

(87) PCT Pub. No.: WO2009/041719
PCT Pub. Date: Apr. 2, 2009

(65) Prior Publication Data
US 2010/0192803 A1 Aug. 5, 2010

(30) Foreign Application Priority Data

Sep. 26, 2007 (JP) .................................. 2007-250099

(51) Int. Cl.
| C09D 5/00 | (2006.01) |
| C09D 101/10 | (2006.01) |
| C09D 101/12 | (2006.01) |
| C09D 101/14 | (2006.01) |
| G02B 5/30 | (2006.01) |
| G02B 1/08 | (2006.01) |
| C09K 19/02 | (2006.01) |

(52) U.S. Cl. ............. 106/170.34; 106/170.35; 428/1.31; 359/485.03

(58) Field of Classification Search ............. 106/170.34, 106/170.35; 428/1.31; 359/485.03
See application file for complete search history.

(56) References Cited

U.S. PATENT DOCUMENTS
2006/0045992 A1* 3/2006 Michihata et al. ............ 428/1.31
2008/0032067 A1 2/2008 Sakurazawa et al.

FOREIGN PATENT DOCUMENTS
| JP | 9-078339 A | 3/1997 |
| JP | 2001-247717 A | 9/2001 |
| JP | 2001-318233 A | 11/2001 |
| JP | 2002-328233 A | 11/2002 |
| JP | 2006-030937 A | 2/2006 |
| JP | 2006-064803 A | 3/2006 |
| JP | 2006-342227 A | 12/2006 |
| JP | 2007-119737 A | 5/2007 |
| JP | 2008-050581 A | 3/2008 |
| WO | WO 2007/000910 A | 1/2007 |

OTHER PUBLICATIONS

International Search Report of PCT/JP2008/067977 dated Dec. 16, 2008.
Written Opinion of the International Searching Authority of PCT/JP2008/067977 dated Dec. 16, 2008.
Plastic Zairyou Kouza, vol. 17, Nikkan Kogyo Shimbun Ltd., "Fibrin Resin", p. 121, 1970.

* cited by examiner

*Primary Examiner* — David M Brunsman
(74) *Attorney, Agent, or Firm* — Buchanan Ingersol & Rooney PC

(57) ABSTRACT

A cellulose acylate film includes a cellulose acylate; and a polyester diol having a hydroxyl group at each of the both terminals in an amount of 5 mass % or more based on the amount of the cellulose acylate.

7 Claims, No Drawings

CELLULOSE ACYLATE FILM, OPTICAL FILM, POLARIZING PLATE, AND LIQUID CRYSTAL DISPLAY APPARATUS

TECHNICAL FIELD

The present invention relates to a cellulose acylate film useful for a liquid crystal display apparatus, and a manufacturing method thereof. More particularly, it relates to an optical material such as an optically-compensatory film or a polarizing plate, and a liquid crystal display apparatus, using the same.

BACKGROUND ART

A cellulose acylate film has been conventionally used for photographic supports or various optical materials because of its toughness and flame retardancy. Particularly, in recent years, it has been often used as an optical transparent film for a liquid crystal display apparatus. The cellulose acylate film is excellent as an optical material for apparatuses using polarized light, such as liquid crystal display apparatuses because of its high optical transparency and high optical isotropy. Accordingly, it has been so far used as a protective film of a polarizer or as a support of an optically-compensatory film capable of improving the display viewed from an oblique direction (viewing angle compensation).

In a polarizing plate which is one of members for a liquid crystal display apparatus, a protective film of a polarizer is formed by bonding on at least one side of the polarizer. A common polarizer can be obtained by dying a stretched polyvinyl alcohol (PVA) type film with iodine or a dichroic colorant. In many cases, as the protective film of the polarizer, a cellulose acylate film, especially a triacetyl cellulose film which can be directly bonded with respect to PVA is used. It is important that the protective film of the polarizer is excellent in optical isotropy. The optical characteristics of the protective film of the polarizer largely control the characteristics of the polarizing plate.

In recent liquid crystal display apparatuses, improvement of viewing angle characteristics has come to be more strongly demanded. Optical transparent films such as a protective film of a polarizer and a support of an optically-compensatory film are required to be optically more isotropic. In order to be optically isotropic, it is important that the retardation value denoted by the product of birefringence and thickness of the optical film is small. Particularly, for improving the display viewed from an oblique direction, not only the in-plane retardation (Re) but also the retardation (Rth) in a thickness-direction are required to be small. Specifically, it is required that, when the optical characteristics of an optical transparent film is evaluated, Re measured from the film front is small, and that the Re does not change even when measured by changing the angle.

There is proposed an optical transparent film showing small changes in angle of Re using a polycarbonate type film or a thermoplastic cycloolefin film in place of a cellulose acylate film (e.g., JP-A-2001-318233 and JP-A-2002-328233, as products, ZEONOR (manufactured by ZEON Corporation), and ARTON (manufactured by JSR), and the like). However, these optical transparent films have a problem in the bonding property with PVA when each film is used as a protective film of a polarizer because the film is hydrophobic. Further, there also remains a problem that the optical characteristics in the entire film plane are nonuniform.

As the solving means therefor, it is strongly demanded that a cellulose acylate film excellent in bonding suitability to PVA is more reduced in optical anisotropy, and improved. Specifically, there is a demand for an optically isotropic optical transparent film, a cellulose acylate film with an in-plane retardation Re set at roughly zero, and further showing small changes in angle of retardation, namely, with a Rth also set at zero.

In manufacturing a cellulose acylate film, generally, a compound called a plasticizer is added in order to improve the film forming performance. As the types of the plasticizer, there are disclosed phosphoric acid triesters such as phosphoric acid triphenyl and biphenyl diphenyl phosphate, and phthalic acid esters (e.g., see, Plastic Zairyou Kouza Vol. 17, Nikkan Kogyo Shimbun Ltd. "Fibrin resin" p. 121, (1970)). Some of these plasticizers are known to have an effect of reducing the optical anisotropy of the cellulose acylate film. For example, specific fatty acid esters are disclosed (e.g., see, JP-A-2001-247717). However, the conventionally known effect of reducing the optical anisotropy of the cellulose acylate film by the use of these compounds cannot be said to be sufficient.

Whereas, in a recent liquid crystal display apparatus, display tint is also required to be improved. For this reason, an optical transparent film such as a protective film of a polarizer or a support of an optically-compensatory film is required not only to be reduced in Re or Rth in a visible region at a wavelength of 400 to 700 nm, but also to be controlled in the changes in Re or Rth according to the wavelength, namely, the wavelength dispersion.

In JP-A-2006-030937, there are disclosed a cellulose acylate film using various low molecular weight Rth-reducing compounds, and a manufacturing method thereof. However, unfavorably, in solution film forming steps, in a step of volatilizing a solvent, the solvent volatilizes, and some deposited solvent in the step falls/drops on the film to cause failures, excess cost is taken in order to separate the volatilized product dissolved in the collected solvent, or in the evaluation of the durability of the film, the additive bleeds out, resulting in a failure. Further, when a saponification treatment is carried out for bonding with a polarizer, unfavorably, the additives flow out, and the optical characteristics of the film change unless the saponification step is stable.

In JP-A-2006-064803, there is disclosed a stretched cellulose ester film containing polyester polyol. In this case, there is a problem that the optical anisotropy is large, and thus, it is not possible to implement a cellulose ester film having a small optical anisotropy.

In WO 07/000,910, there is disclosed a stretched cellulose ester film containing polyester polyol with the main chain terminal sealed by monobasic acid or monoalcohol. In this case, particularly, in the case of a cellulose acylate film, there is a concern on the bleed-out from the film or the durability.

DISCLOSURE OF THE INVENTION

It is a first object of the present invention to provide a cellulose acylate film having high transparency and durability at a low cost without problems such as whitening, bleed-out, and surface condition deterioration, and even without causing problems of vaporization/adhesion of additives to manufacturing equipment or post-processing equipment.

It is a second object of the invention to provide a cellulose acylate film having small optical anisotropy (Re, Rth), and being substantially optically isotropic, and further having small wavelength dispersion of the optical anisotropy (Re, Rth).

It is a third object of the invention to show that optical materials such as an optically-compensatory film and a polarizing plate manufactured with a cellulose acylate film having small optical anisotropy, and small wavelength dispersion, are excellent in viewing angle characteristics, and to provide a liquid crystal display apparatus using them.

As a result of intensive investigations, the inventors of the present invention have found that, by using polyester diol as an additive, it is possible to simultaneously satisfy the control of volatilization of the additive, control of whitening and bleed-out, and improvement of the durability, and the optical anisotropy is sufficiently reduced, and thereby the cellulose acylate film having Re of zero and Rth of close to zero can be prepared. That is, the aforesaid problems can be solved by the following means.

1. A cellulose acylate film comprising:
   a cellulose acylate; and
   a polyester diol having a hydroxyl group at each of the both terminals in an amount of 5 mass % or more based on the amount of the cellulose acylate.
2. The cellulose acylate film as described in above 1, wherein a hydroxyl value (OHV) of the polyester diol is from 40 mgKOH/g to 170 mgKOH/g.
3. The cellulose acylate film as described in above 1, wherein the polyester diol is synthesized from a glycol having 2 to 4 carbon atoms and a dibasic acid having 4 to 6 carbon atoms.
4. The cellulose acylate film as described in above 1, wherein Re and Rth defined by the following formula (I) and formula (II) satisfy the following formula (III) and formula (IV) at a wavelength of 590 nm;

$$Re = (nx - ny) \times d \qquad \text{Formula (I)}$$

$$Rth = \{(nx + ny)/2 - nz\} \times d \qquad \text{Formula (II)}$$

$$|Re| < 10 \qquad \text{Formula (III)}$$

$$|Rth| < 25 \qquad \text{Formula (IV)}$$

wherein
nx denotes a refractive index in a direction of the slow axis in the film plane,
ny denotes a refractive index in a direction of the fast axis in the film plane,
nz denotes a refractive index in a thickness-direction of the film, and
d denotes a thickness (nm) of the film.

5. The cellulose acylate film as described in above 4, wherein the value of Rth represented by the formula (II) is 0 or less at a wavelength of from 450 to 650 nm.
6. A polarizing plate comprising:
   at least one cellulose acylate film as described in any one of above 1 to 5.
7. A liquid crystal display apparatus comprising:
   at least one polarizing plate as described in above 6.

In accordance with the present invention, it is possible to manufacture a cellulose acylate film having small optical anisotropy, which simultaneously satisfies reduction of cost of steps, control of whitening and bleed-out, and improvement of the durability by control of volatilization of additives to the step. Use of the cellulose ester film enabled provision of optical materials such as an optically-compensatory film and a polarizing plate excellent in viewing angle characteristics, and a liquid crystal display apparatus using them. By using a cellulose acylate film having small optical anisotropy and small wavelength dispersion for the protective film of a polarizing plate, it is possible to improve the optical characteristics of the polarizing plate. Whereas, when the cellulose acylate film is used as the support of the optically-compensatory film, it is possible to bring out the optical characteristics of the optically-compensatory film itself. By using these polarizing plates or optically-compensatory films for a liquid crystal display apparatus, it is possible to improve the contrast, and to improve the tint.

BEST MODE FOR CARRYING OUT THE INVENTION

[Cellulose Acylate Raw Material Cotton]

As the raw material cellulose for cellulose acylate for use in the invention there is cotton linter, wood pulp (broad-leaved tree or conifer pulp), or the like. Cellulose acylate obtainable from any raw material cellulose can be used. In some cases, a mixture thereof may be used. The raw material cellulose is described in details in, for example, Plastic Zairyou Kouza (17), Fibrin resin (written by Marusawa and Uda, Nikkan Kogyo Shimbun Ltd., issued in 1970), and in Journal of Technical Disclosure (KOUKAI GIHOU) from Japan Institute of Invention and Innovation, Technical Disclosure No. 2001-1745, (page 7 and page 8). The cellulose described therein can be used. The cellulose acylate film of the invention has no particular restriction.

[Cellulose Acylate Substitution Degree]

Then, a description will be given to the cellulose acylate of the invention manufactured using the foregoing cellulose as a raw material. The cellulose acylate of the invention is configured such that a hydroxyl group of cellulose has been acylated. For the substituents, any of acyl groups of from an acetyl group having 2 carbon atoms to the one having 22 carbon atoms can be used. As a measuring method of the substitution degree of acetic acid and/or fatty acid having 3 to 22 carbon atoms to substitute for the hydroxyl group of cellulose in the cellulose acylate of the invention, a method according to D-817-91 of ASTM or the NMR method can be exemplified.

In the cellulose acylate of the invention, the degree of substitution for the hydroxyl group of cellulose has no particular restriction. However, when the cellulose acylate is employed for use as a polarizing plate protective film or an optical film, the film with a higher acyl substitution degree is preferable because of its excellent moisture permeability and moisture absorbency. For this reason, the acyl substitution degree for the hydroxyl group of cellulose is preferably 2.50 to 3.00. Further, the substitution degree is preferably 2.70 to 2.96, and more preferably 2.80 to 2.94.

Out of acetic acid and/or fatty acid having 3 to 22 carbon atoms to substitute for the hydroxyl group of cellulose, an acyl group having 2 to 22 carbon atoms may be an aliphatic group or an aromatic group, and has no particular restriction. These may be used alone, or in a mixture of two or more thereof. Examples thereof may include alkyl carbonyl ester, alkenyl carbonyl ester, or aromatic carbonyl ester, and aromatic alkyl carbonyl ester of cellulose, and each may further have a substituted group. As preferred acyl groups thereof, mention may be made of an acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexane carbonyl, oleoyl, benzoyl, naphthyl carbonyl, or cinnamoyl group, or the like. Out of these, preferred is an acetyl, propionyl, butanoyl, dodecanoyl, octadecanoyl, t-butanoyl, oleoyl, benzoyl, naphthyl carbonyl, or cinnamoyl group, or the like. Particularly preferred is an acetyl, propionyl or butanoyl group.

Out of these, from the viewpoints of ease of synthesis, cost, ease of control of the substituent group distribution, and other viewpoints, an acetyl group and a mixed ester with an acetyl group and a propyl group are preferred, with an acetyl group being particularly preferred.

[Polymerization Degree of Cellulose Acylate]

The polymerization degree of cellulose acylate to be preferably used in the invention is, in terms of viscosity average polymerization degree, 180 to 700, and for cellulose acetate, more preferably 180 to 550, further preferably 180 to 400, and in particular preferably 180 to 350. When the polymerization degree is too high, the viscosity of the dope solution of cellulose acylate tends to become high, and manufacturing of a film by casting tends to become difficult. When the polymerization degree is too low, the strength of the manufactured film tends to be reduced. The average polymerization degree can be measured with the limiting viscosity method (Uda Kazuo, and Saito Hideo, SENNI GAKKAISHI, vol. 18, No. 1, pages 105 to 120, 1962). It is further described in details in JP-A-9-95538.

Whereas, the molecular weight distribution of cellulose acylate to be preferably used in the invention is evaluated by gel permeation chromatography. It is preferable that the polydisperse index Mw/Mn (where Mw denotes the mass average molecular weight, and Mn denotes the number average molecular weight) is small, and that the molecular weight distribution is narrow. The specific value of Mw/Mn is preferably 1.0 to 4.0, further preferably 2.0 to 3.5, and most preferably 2.3 to 3.4.

When low molecular weight components are removed, usefully, the average molecular weight (polymerization degree) increases, but the viscosity becomes lower than that of general cellulose acylate. Cellulose acylate low in content of low molecular weight components can be obtained by removing the low molecular weight components from cellulose acylate synthesized with a general method. Removal of the low molecular weight components can be carried out by washing cellulose acylate with a proper organic solvent. Incidentally, when cellulose acylate low in content of low molecular weight components is produced, the amount of a sulfuric acid catalyst in the acetylation reaction is preferably adjusted to 0.5 to 25 parts by mass per 100 parts by mass of cellulose. When the amount of the sulfuric acid catalyst is set within the range, it is possible to synthesize cellulose acylate preferable also in terms of molecular weight distribution (narrow in molecular weight distribution). For use in the production of cellulose acylate film of the invention, cellulose acylate has a moisture content of preferably 2 mass % or less, further preferably 1 mass % or less, and in particular 0.7 mass % or less. It is generally known that cellulose acylate contains water, and has a moisture content of 2.5 to 5 mass %. In the invention, in order to achieve the moisture content of cellulose acylate, drying is necessary. The method thereof has no particular restriction so long as it provides an objective moisture content. As for the cellulose acylates of the invention, the raw material cotton and the synthesis method thereof are described in details on p. 7 to 12 in Journal of Technical Disclosure (KOUKAI GIHOU) from Japan Institute of Invention and Innovation, (Technical Disclosure No. 2001-1745, issued on Mar. 15, 2001, Institute of Invention and Innovation).

In the invention, the cellulose acylates can be used alone, or in a mixture of two or more thereof from the viewpoints of substituents, degree of substitution, polymerization degree, molecular weight distribution and the like.

[Polyester Diol Additive]

A polyester diol additive for use in the invention will be described.

As for the polyester diol, the structure, the molecular weight, and the addition amount of the one compatible with a cellulose acylate dope and a cellulose acylate film can be selected so as to satisfy desirable optical characteristics.

The polyester diols to be used in the invention are preferably those wherein each of the both terminals of the main chain is an alcoholic hydroxyl group in view of obtaining both compatibility with the cellulose acylate dope and the cellulose acylate film and controlling of optical properties. Particularly, the addition amount is set at preferably 5 mass % or more, further preferably 9 to 40 mass %, and in particular preferably 10 to 30 mass % based on the amount of cellulose acylate.

In the cellulose acylate film of the invention, it is important for keeping the quality constant that the hydroxyl value (OHV) and the molecular weight of polyester diol are controlled within given ranges for control of the optical anisotropy. Particularly, the hydroxyl value is also preferable for quality control. To the measurement of the hydroxyl value, the acetic acid anhydride method described in Japanese Industrial Standard JIS K1557-1:2007, or the like is applicable.

The hydroxyl value is preferably 40 mg KOH/g or more and 170 mg KOH or less, more preferably 60 mg KOH/g or more and 150 mg KOH or less, particularly preferably 90 mg KOH/g or more and 140 mg KOH or less.

In case when the hydroxyl value is too large, there result a smaller molecular weight and a larger amount of low-molecular components, which leads to larger volatile properties, thus such hydroxyl value being liable to be unfavorable whereas, in case when the hydroxyl value is too small, there result a poor solubility in a solvent and a poor compatibility with cellulose acylate, thus such hydroxyl value being liable to be unfavorable.

The number average molecular weight (Mn) of the polyester diol of the invention can be determined by calculating from the hydroxyl value or by measuring GPC. The molecular weight is preferably 650 or more and 2800 or less, more preferably 700 or more and 2000 or less, and in particular preferably 800 or more and 1250 or less. Further, in order to achieve optical isotropy, the one of 800 or more and 1200 or less is in particular preferably used.

The polyester diol for use in the invention can be produced with a known method such as the dehydration condensation reaction of dibasic acid and glycol, or addition of dibasic acid anhydride to glycol, and the dehydration condensation reaction.

Herein, examples of the dibasic acid which constitutes the polyester diol to be used in the invention may include succinic acid, glutaric acid, adipic acid, and maleic acid. These are used alone, or in combination of two or more thereof. For example, succinic acid, adipic acid, or a mixture thereof is preferably used.

Herein, the number of carbon atoms of the dibasic acids is preferably 4 to 8, more preferably 4 to 6, and in particular preferably 6. Dibasic acids having a less number of carbon atoms serve to reduce moisture permeability of the cellulose acylate film and are also preferred in view of compatibility and further, in view of production cost and handling properties of polyester diol, the number of carbon atoms of the dibacic acid is preferably 6.

As diol constituting the polyester diol for use in the invention, the preferred one can be selected from various diols such as ethylene glycol, diethylene glycol, 1,2-propylene glycol, 1,3-propylene glycol, and butylenes glycol. However, the one with 2 to 4 carbon atoms is preferable, and ethylene glycol having 2 carbon atoms is in particular preferable. This is because the one with a smaller number of carbon atoms is more excellent in compatibility with a cellulose ester dope or a cellulose ester film, and is more excellent in bleed-out resistance due to a moist heat thermostat.

[Additive]

To the cellulose acylate film of the invention, not only the polyester diol described previously, but also, further, a low molecular weight or oligomer, or high molecular weight additive can be added as a plasticizer, a wavelength dispersion control agent, a light resistance improver, a mat agent, an optical anisotropy adjusting agent, or the like according to the intended purpose.

[Optical Anisotropy Adjusting Agent]

As an example of these additives, an optical anisotropy adjusting agent will be described. The optical anisotropy of the cellulose ester film of the invention is controlled by the structure of the polyester diol described previously. However, a different optical anisotropy adjusting agent may be further added thereto. For example, mention may be made of the compounds for reducing Rth described on pages 23 to 72 of JP-A-2006-30937 as examples.

[Cellulose Acylate Film Having Small Optical Anisotropy]

The cellulose acylate film of the invention is in particular preferably the one having small optical anisotropy. It is preferably formed such that Re and Rth measured at a wavelength of 590 nm (defined by the following formulae (I) and (II)) satisfy both of the formula (III)/formula (IV). This value can be controlled by the substitution degree of cellulose ester cotton, the amount of the polyester diol to be added, the type and the amount of the optical anisotropy adjusting agent, the thickness of the film, or the like. Particularly, the polyester diol for use in the invention is an additive excellent in the control.

$$Re=(nx-ny)\times d \quad \text{Formula (I)}$$

$$Rth=\{(nx+ny)/2-nz\}\times d \quad \text{Formula (II)}$$

$$|Re|<10 \quad \text{Formula (III)}$$

$$|Rth|<25 \quad \text{Formula (IV)}$$

[where in the formulae, nx denotes the refractive index in the direction of the slow axis in the film plane, ny denotes the refractive index in the direction of the fast axis in the film plane, nz denotes the refractive index in a thickness-direction of the film, and d denotes the thickness (nm) of the film.

[Wavelength Dispersion Adjusting Agent]

Whereas, as an example of these additives, a wavelength dispersion-reducing compound (which is also hereinafter referred to as a wavelength dispersion adjusting agent) for making the cellulose acylate film of the invention more isotropic can be added. Below, the wavelength dispersion adjusting agent will be described.

The wavelength dispersion adjusting agent contains at least one compound which has an absorption in an ultraviolet region at 200 to 400 nm, and reduces the |Re (400)-Re (700)| and |Rth (400)-Rth (700)| of the film in an amount of 0.01 to 30 mass % based on the cellulose acylate solid content, and thereby can adjust the wavelength dispersion of Re and Rth of the cellulose acylate film. (Herein, Re (λ) and Rth (λ) are the values of Re and Rth at a wavelength of λ nm, respectively.)

Whereas, in recent years, for liquid crystal display apparatuses such as a television, a notebook personal computer, and a mobile type portable terminal, in order to enhance the luminance with less electric power, there is a demand for those excellent in transmittance of optical members to be used in each liquid crystal display apparatus. For the cellulose acylate film of the invention, desirably, the spectral transmittance at a wavelength of 380 nm is 45% or more and 95% or less, and the spectral transmittance at a wavelength of 350 nm is 10% or less.

The wavelength dispersion adjusting agent to be preferably used in the invention as described above, preferably does not volatilize in the processes of dope casting and drying of manufacturing of the cellulose acylate film. It preferably has a molecular weight of preferably 250 or more, more preferably 300 or more, further preferably 350 or more, and in particular preferably 400 or more from the viewpoint of the volatility. Within these molecular weight ranges, a specific monomer structure is acceptable, or an oligomer structure or a polymer structure in which a plurality of the monomer units are combined is also acceptable.

(Amount of Wavelength Dispersion Adjusting Agent Added)

The amount of the wavelength dispersion adjusting agent added, to be preferably used in the invention is preferably 0.01 to 30 mass %, more preferably 0.1 to 20 mass %, and in particular preferably 0.2 to 10 mass % based on the amount of the cellulose acylate.

(Method of Adding Compound)

Further, these wavelength dispersion adjusting agents may be used alone, or may be used in mixture of two or more of the compounds at a given ratio.

Whereas, the timing of adding the wavelength dispersion adjusting agents may be any of the timings during the dope manufacturing step, or addition may be carried out in the final timing during the dope preparation step.

Specific examples of the wavelength dispersion adjusting agent to be preferably used in the invention may include, for example, benzotriazole type compounds, benzophenone type compounds, triazine type compounds, cyanoacrylate type compounds, salicylic acid ester type compounds, and nickel complex salt type compounds. However, the invention is not limited only to these compounds.

(Mat Agent Fine Particles)

To the cellulose acylate film of the invention, fine particles are preferably added as a mat agent. As the fine particles for use in the invention, mention may be made of those of silicon dioxide, titanium dioxide, aluminum oxide, zirconium oxide, calcium carbonate, talc, clay, sintered kaolin, sintered calcium silicate, hydrated calcium silicate, aluminum silicate, magnesium silicate, and calcium phosphate. As the fine particle, the one containing silicon is preferred because of its low turbidity, and particularly silicon dioxide is preferred. The fine particles of silicon dioxide have a primary average particle diameter of 20 nm or less, and an apparent specific gravity of 70 g/l or more. The ones having an average diameter of primary particles of as small as 5 to 16 nm are more preferred because they can reduce the haze of the film. The apparent specific gravity is preferably 90 to 200 g/l or more, and further preferably 100 to 200 g/l or more. The ones with a larger apparent specific gravity is preferred because they can form a high-concentration dispersion, resulting in improvements of the haze and the aggregate.

These fine particles generally form secondary particles with an average particle diameter of 0.1 to 3.0 μm. These fine particles are present in the form of aggregates of primary particles in the film, and form 0.1- to 3.0-μm unevenness on the film surface. The secondary average particle diameter is preferably 0.2 μm or more and 1.5 μm or less, further preferably 0.4 μm or more and 1.2 μm or less, and most preferably 0.6 μm or more and 1.1 μm or less. The primary or secondary particle diameter is defined as follows. The particles in the film are observed by a scanning type electron microscope, and the diameter of the circle circumscribing the particle is taken as the particle diameter. Whereas, in another site, 200 particles are observed. The average value thereof is taken as the average particle diameter.

As the fine particles of silicon dioxide, there can be used commercially available products such as AEROSIL R972, R972V, R974, R812, 200, 200V, 300, R202, OX50, and TT600 (all manufactured by NIPPON AEROSIL Co., Ltd.). The fine particles of zirconium oxide are commercially available under the trade names of AEROSIL R976 and R811 (all manufactured by NIPPON AEROSIL Co., Ltd.), and usable.

Out of these, AEROSIL 200V and AEROSIL R972V are fine particles of silicon dioxide having a primary average particle diameter of 20 nm or less, and an apparent specific gravity of 70 g/l or more, and these are in particular preferable because these have a large effect of reducing the coefficient of friction while keeping low the turbidity of the optical film.

In the invention, in order to obtain a cellulose acylate film having particles with a small secondary average particle diameter, some techniques are conceivable for preparing dispersions of fine particles. For example, there is the following method: a fine particle dispersion obtained by stirring and mixing a solvent and fine particles is previously formed; the fine particle dispersion is added to a small amount of a cellulose acylate solution separately prepared, and dissolved therein with stirring; and the resulting solution is further mixed with a main cellulose acylate dope solution. This method is a preferable preparation method in that the dispersibility of silicon dioxide fine particles is good, and that silicon dioxide fine particles are less likely to further aggregate again. Other than this, there is another method as follows: a small amount of cellulose ester is added to a solvent, and dissolved therein with stirring; then, fine particles are added thereto, and dispersed therein by means of a dispersing machine, so that the resulting dispersion is taken as a fine particle-added solution; then, the fine particle-added solution is sufficiently mixed with a dope solution by means of an inline mixer. The invention is not limited to these methods. However, the concentration of silicon dioxide when silicon dioxide fine particles are mixed with a solvent or the like, and dispersed therein is preferably 5 to 30 mass %, further preferably 10 to 25 mass %, and most preferably 15 to 20 mass %. A higher dispersion concentration is preferred because the solution turbidity becomes lower relative to the amount added, resulting in improvements of the haze and the aggregate. The amount of the mat agent to be added in the final cellulose acylate dope solution is preferably 0.01 to 1.0 g, further preferably 0.03 to 0.3 g, and most preferably 0.08 to 0.16 g per square meter. Also, in the case where the cellulose acylate film is formed by multi-layers, the mat agent is preferably added to only the layer on the surface side without adding to the inner layer(s). In such case, the amount of the mat agent to be added to the surface layer is preferably 0.001 mass % to 0.2 mass %, further preferably 0.01 mass % to 0.1 mass %.

As the solvents to be used for dispersion, lower alcohols are preferred. Examples thereof include methyl alcohol, ethyl alcohol, propyl alcohol, isopropyl alcohol, and butyl alcohol. Other solvents than lower alcohols have no particular restriction. However, the solvents to be used for the film formation of cellulose acylate are preferably used.

[Other Additives]

Other than the compound for reducing the optical anisotropy, and the wavelength dispersion adjusting agent, to the cellulose acylate film of the invention, various additives (e.g., a plasticizer, an ultraviolet absorber, a deterioration inhibitor, a release agent, and an infrared absorber) according to the use in each preparation step can be added. They may be each either a solid or an oily substance. Namely, it has no particular restriction on the melting point or the boiling point. For example, mention may be made of mixing of ultraviolet absorbing materials of 20° C. or less and 20° C. or more, and, similarly, mixing of a plasticizer. For example, they are described in JP-A-2001-151901, or the like. Still further, examples of the infrared absorbing dyes are described in, for example, JP-A-2001-194522. Whereas, for the timing of addition, the additives may be added at any timing in the dope production process. However, a step of adding the additives for preparation may be added to the final preparation step in the dope production process for carrying out the addition. Still further, the amount of each material to be added has no particular restriction so long as it allows the function to be exerted. Whereas, when the cellulose acylate film is formed in a multilayered structure, the types and the amounts of additives for respective layers may be different. Although these are described in, for example, JP-A-2001-151902, these are conventionally known techniques. For the details thereof, there can be preferably used the materials described in details on p. 16 to 22 in Journal of Technical Disclosure (KOUKAI GIHOU) from Japan Institute of Invention and Innovation, (Technical Disclosure No. 2001-1745, issued on Mar. 15, 2001, Institute of Invention and Innovation).

[Addition Amount of Additive]

In the cellulose acylate film of the invention, the total amount of the compounds each having a molecular weight of 5000 or less is preferably 0.1 to 45 mass % based on the mass of the cellulose acylate. More preferably, it is 0.5 to 30 mass %, and further desirably 0.5 to 20 mass %.

[Organic Solvent for Cellulose Acylate Solution]

In the invention, the cellulose acylate film is preferably manufactured by a solvent cast method. The film is manufactured by using a solution (dope) obtained by dissolving cellulose acylate in an organic solvent. As an organic solvent to be preferably used as a main solvent of the invention, preferred is a solvent selected from esters, ketones, and ethers having 3 to 12 carbon atoms, and hydrocarbon halides having 1 to 7 carbon atoms. Each of esters, ketones, and ethers may have a cyclic structure. A compound having two or more of any of functional groups of esters, ketones, and ethers (i.e., —O—, —CO—, and —COO—) can also be used as a main solvent. It may also have other functional groups such as an alcoholic hydroxyl group.

As described up to this point, for the cellulose acylate film of the invention, a chlorine type hydrocarbon halide may be used as a main solvent. Alternatively, as described in Journal of Technical Disclosure (KOUKAI GIHOU) from Japan Institute of Invention and Innovation, 2001-1745, (page 12 to page 16), a non-chlorine type solvent may be used as a main solvent. There is no particular restriction for the cellulose acylate film of the invention.

Other than these, the cellulose acylate solution and the solvents for the film of the invention including the dissolution method therefor are disclosed in the following patent publications, as preferred embodiments. These are described in, for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-11-21379, JP-A-10-182853, JP-A-10-278056, JP-A-10-279702, JP-A-10-323853, JP-A-10-237186, JP-A-11-60807, JP-A-11-152342, JP-A-11-292988, and JP-A-11-60752. In accordance with the patent publications, there is also a description not only on the preferred solvents for the cellulose acylate of the invention but also on the solution physical properties and the substances to be allowed to be present therewith. The disclosed forms are also the preferred embodiments in the invention.

[Cellulose Acylate Film Manufacturing Step]

[Dissolution Step]

For preparation of the cellulose acylate solution (dope) of the invention, the dissolution method thereof has no particular restriction. It may be carried out at room temperature, and further, dissolution is carried out with a cooling dissolution method or a high temperature dissolution method, or further a combination of these. For the preparation of the cellulose acylate solution in the invention, and further, respective steps of solution concentration and filtration involved in the dissolution step, there is preferably used the manufacturing step described in details on pages 22 to 25 of Journal of Technical Disclosure (KOUKAI GIHOU) from Japan Institute of Invention and Innovation, (Technical Disclosure No. 2001-1745, issued on Mar. 15, 2001, Institute of Invention and Innovation).

[Casting, Drying, Winding Steps]

Then, a description will be given to the manufacturing method of a film using the cellulose acylate solution of the invention. As the method and equipment for manufacturing the cellulose acylate film of the invention, there are used the solution casting film forming method and the solution casting film forming apparatus conventionally made available for manufacturing of a cellulose triacetate film. The dope (cellulose acylate solution) prepared from a dissolution apparatus (tank) is once stored in a storage tank. Then, the foams contained in the dope are removed for final preparation. The dope is fed from a dope outlet through, for example, a pressing type metering gear pump capable of quantitative solution feeding with high precision according to the number of revolutions, to a press type die. The dope is evenly cast from the nozzle (slit) of the press type die onto the metal support of the casing part running endlessly. At the peeling point at which the metal support has almost completed one revolution, the dope film not completely dried (which is also referred to as a web) is peeled off from the metal support. The opposite sides of the resulting web are fixed with clips, so that the web is transported by a tenter while holding the width, and dried. Subsequently, the obtained film is mechanically transported with a roll group of a drying apparatus to complete drying. Then, it is wound in a prescribed length by a winder. The combination of the tenter and the drying apparatus of the roll group varies according to the intended purpose. As another form, it is possible to adopt various methods of film formation by a solvent cast method, such as a method in which using the metal support cooled to 0° C. or less as a drum, a dope cast from a die onto the drum is gelated, and then, released off therefrom at the point of time at which about one revolution has been completed, and transported while being stretched by a pin-like tenter, and dried. In the solution casting film forming method to be used for a functional polarizing plate protective film which is an optical member for an electronic display and is a principal use of the cellulose acylate film of the invention or for a silver halide photographic photosensitive material, other than the solution casting film forming apparatus, a coating apparatus is often added thereto for the surface processing on the film such as an undercoat layer, an antistatic layer, an antihalation layer, or a protective layer. These are described in details on pages 25 to 30 in Journal of Technical Disclosure (KOUKAI GIHOU) from Japan Institute of Invention and Innovation, (Technical Disclosure No. 2001-1745, issued on Mar. 15, 2001, Institute of Invention and Innovation). The description is classified into casting (including co-casting), a metal support, drying, peeling, and the like, which can be preferably employed in the invention.

[Thickness of Film]

Whereas, the thickness of the cellulose acylate film is preferably 20 to 120 µm, further preferably 30 to 90 µm, and in particular preferably 35 to 80 µm. Whereas, when the film is used as a polarizer protective film to be bonded to a liquid crystal panel, a thickness of 30 to 65 µm is in particular preferable because warp of the panel in association with changes in temperature and humidity is small.

[Haze of Film]

As the optical film, the transparency of the film is important. As the cellulose acylate film of the invention, a cellulose acylate film with a smaller haze is more preferred, and the haze is preferably 0.01 to 2.0%. It is more preferably 1.0% or less, and further preferably 0.5% or less.

For the measurement of the haze, a 40 mm×80 mm cellulose acylate film sample of the invention is measured at 25° C. and 60% RH by means of a haze meter (HGM-2DP, SUGA Test Instruments) according to JIS K-6714.

[Evaluation Method of Cellulose Acylate Film of the Invention]

For the evaluation of optical properties of the cellulose acylate film of the invention, measurement is carried out in the following manner.

(In-Plane Retardation Re, Retardation in a Thickness-Direction Rth)

A 30 mm×40 mm sample is humidity controlled at 25° C. and 60% RH for 2 hours. $Re(\lambda)$ is measured by means of an automatic birefringent meter KOBRA 21ADH (manufactured by Oji Scientific Instruments Co., Ltd.) for light with a wavelength of $\lambda$ nm made incident in the direction of film normal. Whereas, $Rth(\lambda)$ is calculated by inputting a hypothetical value of the average refractive index of 1.48, and the film thickness based on the following retardation values measured in a total of 3 directions. The retardation values are: the Re; the retardation value measured for light with a wavelength of $\lambda$ nm made incident from the direction tilted at +40° with respect to the direction of film normal with the in-plane slow axis as a tilting axis; and the retardation value measured for light with a wavelength of $\lambda$ nm made incident from the direction tilted at −40° with respect to the direction of film normal with the in-plane slow axis as a tilting axis.

(Wavelength Dispersion Measurement of Re and Rth)

A 30 mm×40 mm sample is humidity controlled at 25° C. and 60% RH for 2 hours. By means of an ellipsometer M-150 (manufactured by JASCO Corporation), light with a wavelength of 780 nm to 380 nm is made incident in the direction of film normal, and thereby Re's at respective wavelengths are determined to measure the wavelength dispersion of Re. Whereas, the wavelength dispersion of Rth is calculated by inputting a hypothetical value of the average refractive index of 1.48, and the film thickness based on the following retardation values measured in a total of 3 directions. The retardation values are: the Re; the retardation value measured for light with a wavelength of 780 to 380 nm made incident from the direction tilted at +40° with respect to the direction of film normal with the in-plane slow axis as a tilting axis; and the retardation value measured for light with a wavelength of 780 to 380 nm made incident from the direction tilted at −40° with respect to the direction of film normal with the in-plane slow axis as a tilting axis.

Other preferable characteristics of the cellulose acylate film of the invention will be described.

[Residual Solvent Amount of Film]

Drying is preferably carried out under the conditions such that the residual solvent amount for the cellulose acylate film of the invention becomes 1.5 mass % or less, and more preferably 1.0 mass % or less.

[Contact Angle of Film Surface by Alkali Saponification Treatment]

When the cellulose acylate film of the invention is used as a transparent protective film of a polarizing plate, an alkali saponification treatment can be mentioned as one of effective means of the surface treatment. In this case, the contact angle of the film surface after the alkali saponification treatment is preferably 55° or less, more preferably 50° or less, and further preferably 45° or less. The contact angle is evaluated with a common method in the following manner.

[Surface Treatment]

The cellulose acylate film may be subjected to a surface treatment, which can achieve the improvement of the adhesion between the cellulose acylate film and respective functional layers (e.g., an undercoat layer and a back layer). For example, a glow discharge treatment, an ultraviolet irradiation treatment, a corona treatment, a flame treatment, and an acid or alkali treatment can be employed. The glow discharge treatment herein referred to may be a low temperature plasma caused under a low pressure gas of $10^{-3}$ to 20 Torr, and further preferably a plasma treatment under an atmospheric pressure. The plasma excitable gas denotes a gas that can be excited into plasma under the conditions as described above. Mention may be made of argon, helium, neon, krypton, xenon, nitrogen, carbon dioxide, flons such as tetrafluoromethane, mixtures thereof, and the like. These are described in details on p. 30 to 32 in Journal of Technical Disclosure (KOUKAI GIHOU) from Japan Institute of Invention and Innovation, (Technical Disclosure No. 2001-1745, issued on Mar. 15, 2001, Institute of Invention and Innovation), which can be preferably employed in the invention.

[Functional Layer]

The cellulose acylate film of the invention is applied to, for example, an optical use and a photographic photosensitive material as the uses thereof. Particularly, the optical use is preferably a liquid crystal display apparatus. The liquid crystal display apparatus is further preferably configured to have a liquid crystal cell including liquid crystal held between two electrode substrates, two polarizing elements placed on the opposite sides thereof, and at least one optically-compensatory sheet placed between the liquid crystal cell and the polarizing device. The liquid crystal display apparatuses are preferably of TN, IPS, FLC, AFLC, OCB, STN, ECB, VA, and HAN.

Then, for using the cellulose acylate film of the invention for the optical use, imparting of various functional layers is carried out. They are, for example, an antistatic layer, a curable resin layer (transparent hard coat layer), an antireflection layer, an easy-to-adhere layer, an antiglare layer, an optically-compensatory layer, an alignment layer, and a liquid crystal layer. As the functional layers and materials therefor, mention may be made of a surfactant, a slipping agent, a mat agent, an antistatic layer, a hard coat layer, and the like. They are described in details on pages 32 to 45 in Journal of Technical Disclosure (KOUKAI GIHOU) from Japan Institute of Invention and Innovation, (Technical Disclosure No. 2001-1745, issued on Mar. 15, 2001, Institute of Invention and Innovation), which can be preferably used in the invention.

[Use (Polarizing Plate)]

The use of the cellulose acylate film of the invention will be described.

When the cellulose acylate film of the invention is used as an optical film, it is particularly useful for a polarizing plate protective film. When it is used as a polarizing plate protective film, the manufacturing method of the polarizing plate has no particular restriction, and the polarizing plate can be manufactured with a common method. There is the following method: the obtained cellulose acylate films are subjected to an alkali treatment, and bonded by the use of a fully saponified polyvinyl alcohol aqueous solution to the opposite sides of the polarizer manufactured by immersing a polyvinyl alcohol film in an iodine solution for stretching. In place of the alkali treatment, the easy adhesion treatment as described in JP-A-6-94915 and JP-A-6-118232 may be performed.

Examples of the adhesive to be used for boning the protective film treated side and the polarizer may include polyvinyl alcohol type adhesives such as polyvinyl alcohol and polyvinyl butyral, and vinyl type latexes such as butyl acrylate.

The polarizing plate includes a polarizer, and protective films protecting the opposite sides thereof. Further, the polarizing plate may be configured such that a protective film is bonded on one side of the polarizing plate, and a separate film is bonded on the opposite side thereof. The protective film and the separate film are used for the purpose of protecting the polarizing plate during the shipment of the polarizing plates, during the product inspection, or the like. In this case, the protective film is bonded for the purpose of protecting the surface of the polarizing plate, and it is used on the side of the polarizing plate opposite from the side to be bonded to the liquid crystal plate. Whereas, the separate film is used for the purpose of covering the adhesion layer to be bonded to the liquid crystal plate, and it is used on the surface side of the polarizing plate to be bonded to the liquid crystal plate.

In a liquid crystal display apparatus, generally, a substrate including liquid crystal between two polarizing plates is placed. However, the polarizing plate protective film to which the optical film of the invention has been applied can provide excellent display property even when placed at any site. Particularly, on the polarizing plate protective film of the outermost surface on the display side of the liquid crystal display apparatus, a transparent hard coat layer, an antiglare layer, an antireflection layer, and the like are provided. Therefore, the polarizing plate protective film is in particular preferably used at the portion.

[Use (Optically-Compensatory Film)]

The cellulose acylate film of the invention can be employed for various uses. It is particularly effective when used as an optically-compensatory film of a liquid crystal display apparatus. Incidentally, the optically-compensatory film is generally used in a liquid crystal display apparatus. It denotes the optical material for compensating for the phase difference, and is synonymous with a phase plate, an optically-compensatory sheet, or the like. The optically-compensatory film has birefringence, and is used for the purposes of removing the coloration of the display screen of the liquid crystal display apparatus, and improving the viewing angle characteristics. When the cellulose acylate film of the invention is manufactured with small optical anisotropy such that Re and Rth are: $0 \leq Re \leq 10$ nm, and $|Rth| \leq 25$ nm, respectively, and an optically anisotropic layer having birefringence is used in combination, it can mainly express only the optical performance of the optically anisotropic layer, and hence it can be preferably used.

Therefore, when the cellulose acylate film of the invention is used as the optically-compensatory film of a liquid crystal display apparatus, the optically anisotropic layer to be used in combination may be any optically anisotropic layer. It is not restricted by the optical performance and the driving method of the liquid crystal cell of the liquid crystal display apparatus in which the cellulose acylate film of the invention is used. Any optically anisotropic layer demanded as an optically-compensatory film can be used in combination. The optically anisotropic layer to be used in combination may be formed from a composition containing a liquid crystalline compound, or may be formed from a polymer film having birefringence. The liquid crystalline compound is preferably a discotic liquid crystalline compound or a rod-like liquid crystalline compound.

(Structure of General Liquid Crystal Display Apparatus)

When the cellulose acylate film is used as an optically-compensatory film, it does not matter at whatever angle the transmission axis of the polarizing element and the slow axis of the optically-compensatory film including the cellulose acylate film are placed. The liquid crystal display apparatus has a structure in which a liquid crystal cell holding liquid crystal between two electrode substrates, two polarizing elements placed on the opposite sides thereof, and at least one optically-compensatory film placed between the liquid crystal cell and the polarizing elements are placed.

The liquid crystal layer of the liquid crystal cell is formed by sealing liquid crystal in the space formed by interposing a spacer between two substrates. The transparent electrode layer is formed on the substrate as a transparent film containing an electrically conductive substance. In the liquid crystal cell, further, a gas barrier layer, a hard coat layer, or an undercoat layer (for use in adhesion with the transparent electrode layer) may be provided. These layers are generally provided on the substrate. The substrate of the liquid crystal cell generally has a thickness of 50 μm to 2 mm.

(Type of Liquid Crystal Display Apparatus)

The cellulose acylate film of the invention can be used for liquid cells of various display modes. Various display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Super Twisted Nematic), VA (Vertically Aligned), ECB (Electrically Controlled Birefringence), and HAN (Hybrid Aligned Nematic) modes have been proposed. Further, a display mode obtained by aligning and segmenting the display mode has also been proposed. The cellulose acylate film of the invention is effective in a liquid crystal display apparatus of any display mode. Further, it is also effective in any liquid crystal display apparatus of a transmission type, a reflection type, and a semi-transmission type.

(IPS Type Liquid Crystal Display Apparatus)

The cellulose acylate film of the invention is also in particular advantageously used as a support for optically-compensatory sheet of an TS type liquid crystal display apparatus having liquid crystal cells of an IPS mode, or each protective film of the polarizing plates. These modes are the forms in which liquid crystal material is in a generally parallel alignment during black display. The liquid crystal molecules are aligned parallel to the substrate plane with no voltage applied for black display. In these forms, the polarizing plate using the cellulose acylate film of the invention is effective to the reduction of changes in tint and contrast depending upon viewing angle.

Also, |Rth|<25 is preferred and, further, in the region of from 450 to 650 nm, 0 nm or less is particularly preferred because of the small change in tint.

In this form, for the protective film (protective film on the cell side) placed between the liquid crystal cell and the polarizing plate out of the protective films of the upper and lower polarizing plates of the liquid crystal cell, the polarizing plate using the cellulose acylate film of the invention is preferably used on both sides. Further preferably, an optically anisotropic layer having a retardation value preferably set at two times or less the value of Δn·d of the liquid crystal layer is placed on one side between the protective film of the polarizing plate and the liquid crystal cell.

(Hard Coat Film, Antiglare Film, Antireflection Film)

The cellulose acylate film of the invention can also be preferably applied to a hard coat film, an antiglare film, and an antireflection film. For the purpose of improving the visibility of a flat panel display such as LCD, PDP, CRT, or EL, on one side or on opposite sides of the cellulose acylate film of the invention, any of or all of a hard coat layer, an antiglare layer, and an antireflection layer can be provided. Desirable embodiments as such an antiglare film and an antireflection film are described in details on pages 54 to 57 in Journal of Technical Disclosure (KOUKAI GIHOU) from Japan Institute of Invention and Innovation, (Technical Disclosure No. 2001-1745, issued on Mar. 15, 2001, Institute of Invention and Innovation). The cellulose acylate film of the invention can be preferably used.

(Transparent Substrate)

When the polyester diol in the invention is used, the cellulose acylate film can be formed with an optical anisotropy close to zero, and it has excellent transparency. For this reason, it can also be used as a replacement for a liquid crystal cell glass substrate of a liquid crystal display apparatus, i.e., a transparent substrate for sealing a driving liquid crystal.

The transparent substrate for sealing a liquid crystal is required to be excellent in gas barrier property. Therefore, if required, a gas barrier layer may be provided on the surface of the cellulose acylate film of the invention. The form and material of the gas barrier layer have no particular restriction. However, there are conceivable methods of vapor depositing $SiO_2$ or the like on at least one side of the cellulose acylate film of the invention, or providing a coat layer of a polymer having a relatively high gas barrier property such as vinylidene chloride type polymer or vinyl alcohol type polymer, and these can be appropriately used.

Further, for use as a transparent substrate for sealing a liquid crystal, a transparent electrode for driving a liquid crystal by application of a voltage may be provided. The transparent electrode has no particular restriction. However, by stacking a metal film, a metal oxide film, or the like on at least one side of the cellulose acylate film of the invention, it is possible to provide a transparent electrode. Especially, from the viewpoints of the transparency, the electrical conductivity, and the mechanical characteristics, a metal oxide film is preferred. Especially, a thin film of indium oxide containing mainly tin oxide and zinc oxide in an amount of 2 to 15% can be preferably used. The details of these technologies are disclosed in JP-A-2001-125079 and JP-A-2000-227603, and the like.

Embodiment

Below, the invention will be described by way of examples, which should not be construed as limiting the scope of the invention.

EXAMPLE 1

(Manufacturing of Cellulose Acylate Dope)

The following composition is charged in a mixing tank, and stirred with heating to dissolve respective components, thereby preparing cellulose acetate solutions A-1 to A-12. Incidentally, the solvent compositions of any solution of A-1 to A-12 are as follows. Each solution is prepared in the following manner. The concentration is adjusted so that the concentration of cotton becomes 20 mass %.

| | |
|---|---|
| Methylene chloride (first solvent) | 100 parts by mass |
| Methanol (second solvent) | 19 parts by mass |
| 1-Butanol | 1 part by mass |

TABLE 1

| | Cellulose acylate | | Polyester diol | | | | | |
|---|---|---|---|---|---|---|---|---|
| | Acetyl substitution degree | Part(s) by mass | Dibasic acid | Glycol | Hydroxyl value | Part(s) by mass | Dope turbidity | Film haze (%) |
| A-1 | 2.86 | 100 | AA | EG | 113 | 20 | A | 0.2 |
| A-2 | 2.86 | | AA | PG | 118 | | A | 0.3 |
| A-3 | 2.86 | | AA | BG | 105 | | A | 0.2 |
| A-4 | 2.86 | | AA | HG | 108 | | A | 1.2 |
| A-5 | 2.86 | | CA | EG | 125 | | A | 0.2 |
| A-6 | 2.86 | | CA | PG | 92 | | A | 0.3 |
| A-7 | 2.86 | | SA | EG | 130 | | A | 1.5 |
| A-8 | 2.86 | | SA | HG | 135 | | B | — |
| A-9 | 2.86 | | AA | EG | 19 | | B | — |
| A-10 | 2.86 | | AA | EG | 42 | | A | 0.2 |
| A-11 | 2.86 | | AA | EG | 156 | | A | 0.4 |
| A-12 | 2.86 | | AA | EG | 200 | | A | 0.3 |

In the table, "-" for haze means that, since a result of B is obtained with respect to dope, subsequent formation of the film is not performed.

In the table, AA in the Dibasic acid column denotes adipic acid (C6), CA denotes succinic acid (C4), SA denotes sebacic acid (C10), and EG in the Glycol column denotes ethylene glycol (C2), PG denotes 1,2-propylene glycol (C3), BG denotes 1,4-butylene glycol (C4), and HG denotes 1,6-hexanediol (C6).

Results of visually observing turbidity of the prepared dopes (A: transparent; B: turbid) and the haze values of films obtained by casting on a glass plate and drying are shown in Table 1.

Polyester diols prepared from a dibasic acid and a glycol each having a large number of carbon atoms have a poor solubility for cellulose acylate, and provide a large haze value due to bleed-out or the like, thus the resulting films failing to have satisfactory characteristics as an optical film.

<Manufacturing of Cellulose Acylate Film Samples>

Dopes are prepared in the same manner as described above (Preparation of cellulose acylate dope) and, further, 1.3 parts by mass of the following mat agent dispersion B-1 is added thereto to prepare dopes D-1 to D-14 of the formulations shown in the following Table 2. Cellulose acylate films are formed by using the dopes D-1 to D-14 by means of a small-width test film forming machine as will be described hereinafter.

(Preparation of Mat Agent Dispersion B-1)

The following composition is charged in a dispersing machine and stirred to dissolve respective components, thus a mat agent dispersion B-1 being prepared.

Formulation of the mat agent dispersion B-1

| | |
|---|---|
| Dispersion of silica particles (average particle size: 16 nm) (AEROSIL R972; manufactured by Nippon Aerosil Co., Ltd.) | 10.0 parts by mass |
| Methylene chloride | 72.8 parts by mass |
| Methanol | 3.9 parts by mass |
| Butanol | 0.5 part by mass |
| Cellulose acylate solution (Dope A-11 Described hereinbefore) | 10.3 parts by mass |

As the low molecular ester in Table 2, bis(2-ethylhexyl) adipate is used. Also, the numerals in the column of Wavelength dispersion adjusting agent are addition amounts of the respective agents in terms of parts by mass, and WD-1 to WD-4 are wavelength dispersion adjusting agents and are the following compounds, respectively.

Also, the ester-terminated oligomer in Table 2 is a product obtained by reacting adipic acid with ethylene glycol and, further, with benzoic acid, and GPC measurement thereof reveals that it has an average molecular weight of 1050.

TABLE 2

| | Cellulose acylate | | Polyester diol | | | | Low molecular ester | Ester-terminated oligomer | Wavelength dispersion adjusting agent | | | |
|---|---|---|---|---|---|---|---|---|---|---|---|---|
| | Acetyl substitution degree | Part(s) by mass | Dibasic acid | Glycol | Hydroxyl value | Part(s) by mass | | | WD-1 | WD-2 | WD-3 | WD-4 |
| D-1 | 2.86 | 100 | AA | EG | 113 | 10 | | | | | | |
| D-2 | 2.86 | | AA | EG | 113 | 15 | | | | | | |
| D-3 | 2.86 | | AA | EG | 113 | 20 | | | | | | |
| D-4 | 2.86 | | AA | EG | 113 | 25 | | | 0.4 | 1.6 | | |
| D-5 | 2.86 | | AA | EG | 113 | 20 | | | 0.3 | 1.2 | | |
| D-6 | 2.86 | | AA | EG | 42 | 15 | | | | | | |
| D-7 | 2.86 | | AA | EG | 156 | 15 | | | | | | |
| D-8 | 3.86 | | AA | EG | 200 | 15 | | | | | | |
| D-9 | 2.86 | | CA | EG | 125 | 15 | | | | | | |
| D-10 | 2.86 | | CA | PG | 92 | 15 | | | | | | |
| D-11 | 2.92 | | — | — | — | | | | | | | |
| D-12 | 2.92 | | AA | EG | 113 | 12 | | | | | 1.2 | |

TABLE 2-continued

| | Cellulose acylate | | Polyester diol | | | | Low molecular ester | Ester-terminated oligomer | Wavelength dispersion adjusting agent | | | |
|---|---|---|---|---|---|---|---|---|---|---|---|---|
| | Acetyl substitution degree | Part(s) by mass | Dibasic acid | Glycol | Hydroxyl value | Part(s) by mass | | | WD-1 | WD-2 | WD-3 | WD-4 |
| D-13 | 2.92 | — | — | — | — | | 15 | | | | | 2 |
| D-14 | 2.86 | — | — | — | — | | | 15 | | | | |

WD-1

(structure: chlorobenzotriazole with 2-hydroxy-3-tert-butyl-5-methylphenyl group)

WD-2

(structure: benzotriazole with 2-hydroxy-3,5-di-tert-amylphenyl group)

WD-3

(structure: tetrahydrophthalimide-N-CH₂- linked to hydroxyphenyl-benzotriazole)

WD-4

(structure: 2-hydroxy-4-octyloxybenzophenone type: benzoyl group attached to phenol with O—CH₂—CH₂—CH₂—CH₂—CH₂—CH₂—CH₂—CH₃ and HO substituent)

The cellulose acylate dopes D-1 to D-14 are respectively sufficiently stirred and are heated in a closed vessel to dissolve, thus dopes being prepared. Each dope is cast from a casting port on a drum cooled to −5° C. The film formed is peeled off in the state having a solvent content of 70 mass %. Opposite ends in the direction of width of the film are fixed by a pin tenter (the pin tenter shown in FIG. 3 of JP-A-4-1009), and the film is dried while keeping the distance resulting in a stretching percentage of about 3% in the transverse direction (the direction perpendicular to the machine direction) in the state having a solvent content of 3 to 5 mass %. Thereafter, the film is transported between rollers of a heat treating apparatus, thereby to be further dried. Thus, cellulose acylate film samples F-1 to F-14 with a thickness of about 60 μm are respectively manufactured.

As is shown in Table 3, optical films having intended optical characteristics can be obtained by using the polyester diols of the invention.

Also, cellulose acylate with a hydroxyl value of 200 suffers a weight reduction after being heated (left at 140° C. for 4 hours) as large as 2 to 3 mass %, and causes volatilization during the step, thus involving practical problems.

Cellulose acylate with both ends being esterified involves the problems that the ability of controlling optical performance is somewhat insufficient, that it causes volatilization of low molecular components, and that bleed-out resistance is poor.

TABLE 3

| | Volatilized product (during the step) | Haze % | Re nm | Rth nm | |Rth (400-700)| nm | State 10 days after 60° C. 90% RH | Comprehensive evaluation performance/ manufacturing suitability |
|---|---|---|---|---|---|---|---|
| F-1 | None | 0.2 | 1 | −4 | 26 | No problem | A |
| F-2 | None | 0.2 | 1 | −6 | 27 | No problem | A |
| F-3 | None | 0.2 | 1 | −8 | 28 | No problem | A |
| F-4 | None | 0.2 | 1 | −2 | 23 | No problem | A |

TABLE 3-continued

|  | Volatilized product (during the step) | Haze % | Re nm | Rth nm | \|Rth (400-700)\| nm | State 10 days after 60° C. 90% RH | Comprehensive evaluation performance/ manufacturing suitability |
|---|---|---|---|---|---|---|---|
| F-5 | None | 0.4 | 1 | 5 | 18 | No problem | A |
| F-6 | None | 0.3 | 1 | −4 | 25 | No problem | A |
| F-7 | None | 0.2 | 1 | −8 | 26 | No problem | A |
| F-8 | Volatilized product deposits. | 0.2 | 1 | −10 | 28 | No problem | B |
| F-9 | None | 0.3 | 1 | 2 | 26 | No problem | A |
| F-10 | None | 0.2 | 1 | −5 | 24 | No problem | A |
| F-11 | None | 0.4 | 1 | 30 | 26 | No problem | B |
| F-12 | None | 0.3 | 1 | −2 | 23 | No problem | A |
| F-13 | Volatilized product deposits. | 0.4 | 1 | −4 | 21 | No problem | B |
| F-14 | Volatilized product deposits. | 0.4 | 1 | 10 | 28 | White turbid | B |

In the above table, "A" in the column of Comprehensive evaluation performance/manufacturing suitability means "good", and "B" means "bad".

A dope prepared by using cellulose acetate propionate (total substitution degree=2.68; acetyl substitution degree=0.18; propyl substitution degree=2.50) in place of cellulose acetate used in the dope D-1 is casted on a support of a stainless steel-made endless band of 100 m in length through a casting die and, at the point where the solvent ratio of the dope reaches 45 mass % based on dry weight, is peeled off as a film from the casting support, and is conveyed through a drying zone of a tenter while the both ends thereof being fixed by the tenter having clips to thereby produce a cellulose ester film. Thus, there can be obtained an optical film having the similar characteristics to F-1.

EXAMPLE 2

(Manufacturing of Polarizing Plate)

Each of the cellulose acetate film samples F-1 to F-5 and F-12 of the invention obtained in Example 1 is immersed in a 1.5 N sodium hydroxide aqueous solution at 55° C. for 2 minutes, washed in a room-temperature water washing bath, and neutralized by using 0.05 N sulfuric acid at 30° C. Again, it is washed in a room-temperature water washing bath, and further dried by 100° C. warm air.

Thus, the surface of each of the cellulose acylate films is saponified. At this step, it is indicated that the solution for saponifying the film sample F-13 contains the low molecular weight additive dissolved therein. Other samples than this particularly present no problem of elution.

Subsequently, a roll-like polyvinyl alcohol film with a thickness of 80 μm is continuously stretched in an iodine aqueous solution to 5 times, and dried to obtain a polarizing film. A 3% aqueous solution of polyvinyl alcohol (PVA-117H, manufactured by Kuraray) is used as an adhesive. Thus, one sheet of the cellulose acylate film sample F-1 subjected to an alkali saponification treatment, and one sheet of the commercially available cellulose acylate film (Fuji-Tac TD60UL; manufactured by Fuji Film Co., Ltd.) subjected to an alkali saponification treatment in the same manner as described previously are prepared. The films are bonded with the polarizing film interposed therebetween, thereby to obtain a polarizing plate of which the opposite sides are protected by the cellulose acylate films. At this step, bonding thereof is carried out so that the slow axis of the cellulose acylate film is in parallel to the transmission axis of the polarizing film. Similarly, also for the samples F-1 to F-5 of the invention of Example 1, polarizing plates are manufactured. All of the cellulose acylate film samples F-1 to F-5 of the invention have sufficient bonding property with the stretched polyvinyl alcohol, and has excellent polarizing plate processing suitability. The polarizing plates will be hereinafter referred to as polarizing plates P-1 to P-5, respectively. By using a commercially available cellulose acylate film with a thickness of 60 μm (Fuji-Tac TD60UL; manufactured by Fuji Film Co., Ltd.) in place of the cellulose acylate film sample F-1 of the invention, a polarizing plate having Fuji-Tac TD60UL on opposite sides thereof is manufactured in the same manner as described above. This polarizing plate is referred to as P-TD.

EXAMPLE 3

(Mounting Evaluation on IPS Type Liquid Crystal Display Apparatus)

By the use of the cellulose acylate films obtained in Example 1, and the polarizing plates obtained in Example 2, mounting evaluation on a liquid crystal display apparatus is carried out.

A polarizing plate of a commercially available IPS-TV is carefully peeled, and each of the polarizing plates P-1 to P-5 of the invention is disposed on each side of the IPS cell via an adhesive so that the film of the invention is disposed between the IPS cell and the polarizer.

For each liquid crystal display apparatus manufactured in the foregoing manner, the change in tint is observed in a polar direction of 70 degrees and in an azimuth direction of 0 to 180 degrees from the front of the apparatus is measured. As a result, every sample is found to undergo only a small change in tint. In the case of using P-TD, there results an enhanced yellowish tint.

Also, with P-1 to P-3 wherein the Rth value is 0 nm or less in the region of 450 to 650 nm, the change is at a level where the values of u' and v' in the UCS chromaticity diagram are around 0.2 and 0.42, respectively, and the change in tint is observed only within the blue tint, thus less change in tint being observed. Hence, these samples are more preferred. Samples using P-4 to P-5 give a tint somewhat mixed with red when viewed from diagonally above, though change in tint is small.

Incidentally, data of Rth of F-1 to F-5 are shown in the following table.

TABLE 4

| | Rth (nm) | | |
|---|---|---|---|
| | 550 nm | 450 nm | 630 nm |
| F-1 | −4 | −17 | −1 |
| F-2 | −6 | −20 | −3 |
| F-3 | −8 | −25 | −5 |
| F-4 | −2 | −12 | 3 |
| F-5 | 5 | −8 | 10 |

Out of the polarizing plates manufactured in Example 2, to each of the polarizing plates P-1 to P-5 and the polarizing plate P-TD, an optically-compensatory film obtained by uniaxially stretching an ARTON film (manufactured by JSR) is bonded for imparting the optically-compensatory function thereto. At this step, by allowing the slow axis of the in-plane retardation of the optically-compensatory film to cross with the transmission axis of the polarizing plate at right angles, it is possible to improve the visual characteristics without changing the front characteristics at all. The optically-compensatory film used has an in-plane retardation Re of 270 nm, a retardation in a thickness-direction Rth of 0 nm, and an Nz factor of 0.5.

For each liquid crystal display apparatus manufactured in the foregoing manner, the light leakage ratio during black display in an azimuth direction of 45 degrees and in a polar angle direction of 70 degrees from the front of the apparatus is measured. As a result, out of the polarizing plates each including the cellulose acylate film of the invention, the cases using P-1 to P-5 show a light leakage ratio as small as from 1/50 to 1/4 as compared with the cases using the polarizing plate P-TD.

The results up to this point indicate that the cellulose acylate film of the invention does not contaminate the manufacturing step by the volatilized product, and does not cause problems such as bleed-out and whitening, and does not deteriorate the durability by wet heat, and does not contaminate the saponification solution. Further, it has also been shown that the polarizing plates formed from the cellulose acylate films are easy to process, and are excellent in the polarization performance and the durability.

Further, the following has been shown: the cellulose acylate film of the invention can be manufactured with ease such that the optical characteristics satisfy the formula (III)/the formula (IV); and by the use of it, it is possible to suppress the light leakage and the tint changes of the IPS liquid crystal cell, and to achieve excellent display performances.

EXAMPLE 4

The cellulose acylate solution D-1 of Example 1 is adjusted in the flow rate of the solution cast from a die and the transport speed of the cast support, thereby to manufacture films with thicknesses of 20 μm, 30 μm, 40 μm, 80 μm, and 100 μm. Any of the films can be manufactured without problems on the transparency/retardation of the film. Particularly, the films of 40 μm to 80 μm are manufactured into polarizing plates with the polarizing plate manufacturing method described previously. Then, they are each found to be excellent in processability into a polarizing plate, and hence they are preferred.

INDUSTRIAL APPLICABILITY

As for the cellulose acylate film of the invention, the volatilization of additives during manufacturing, and the durability of the film are excellent. Particularly, it is possible to manufacture a cellulose acylate film having small Re and Rth in a visible region at a wavelength of 400 to 700 nm with stability and at a low cost. This can be used for the protective film of a polarizer, a support of an optically-compensatory film, or the like, thereby to be applied to the field of an image display apparatus improved in display tint.

The entire disclosure of each and every foreign patent application from which the benefit of foreign priority has been claimed in the present application is incorporated herein by reference, as if fully set forth.

The invention claimed is:

1. A cellulose acylate film comprising:
   a cellulose acylate; and
   a polyester diol having a hydroxyl group at each of the both terminals in an amount of 5 mass % or more based on the amount of the cellulose acylate.
2. The cellulose acylate film according to claim 1, wherein a hydroxyl value (OHV) of the polyester diol is from 40 mgKOH/g to 170 mgKOH/g.
3. The cellulose acylate film according to claim 1, wherein the polyester diol is synthesized from a glycol having 2 to 4 carbon atoms and a dibasic acid having 4 to 6 carbon atoms.
4. The cellulose acylate film according to claim 1, wherein Re and Rth defined by the following formula (I) and formula (II) satisfy the following formula (III) and formula (IV) at a wavelength of 590 nm;

$Re = (nx - ny) \times d$  Formula (I)

$Rth = \{(nx + ny)/2 - nz\} \times d$  Formula (II)

$|Re| < 10$  Formula (III)

$|Rth| < 25$  Formula (IV)

wherein
nx denotes a refractive index in a direction of the slow axis in the film plane,
ny denotes a refractive index in a direction of the fast axis in the film plane,
nz denotes a refractive index in a thickness-direction of the film, and
d denotes a thickness (nm) of the film.
5. The cellulose acylate film according to claim 4, wherein the value of Rth represented by the formula (II) is 0 or less at a wavelength of from 450 to 650 nm.
6. A polarizing plate comprising:
   at least one cellulose acylate film according to claim 1.
7. A liquid crystal display apparatus comprising:
   at least one polarizing plate according to claim 6.

* * * * *